US011274924B1

United States Patent
Sudberry et al.

(10) Patent No.: US 11,274,924 B1
(45) Date of Patent: Mar. 15, 2022

(54) ELECTRONIC VIBRATING PLUMB BOB FOR THE DETECTION OF DIFFERING FLUIDS IN TANKS AND VESSELS

(71) Applicant: Mark Edward Sudberry, Trophy Club, TX (US)

(72) Inventors: Mark Edward Sudberry, Trophy Club, TX (US); Nathan T Sudberry, Trophy Club, TX (US); Saravanan Sagar, Dooravaninager (CN)

(*) Notice: Subject to any disclaimer, the term of this patent is extended or adjusted under 35 U.S.C. 154(b) by 16 days.

(21) Appl. No.: 16/984,143

(22) Filed: Aug. 3, 2020

Related U.S. Application Data (63) Continuation-in-part of application No. 62/882,356, filed on Aug. 2, 2019.

(51) Int. Cl.
*G01C 15/10* (2006.01)
*G01F 23/00* (2022.01)
*B63B 17/00* (2006.01)

(52) U.S. Cl.
CPC ........ *G01C 15/105* (2013.01); *G01F 23/0007* (2013.01); *B63B 17/0027* (2013.01)

(58) Field of Classification Search
CPC ... G01C 15/105; G01F 23/0007; G01F 23/00; G01F 23/04; G01F 23/247; G01F 23/28; G01F 23/03; B63B 17/0027; H04N 21/42221; H05B 47/195; H05B 47/21; H05B 47/13; H04B 10/00; G01Q 30/00; G01P 13/0073; G05B 2219/37032

See application file for complete search history.

(56) References Cited

U.S. PATENT DOCUMENTS

| | | | | | |
|---|---|---|---|---|---|
| 2,302,536 | A | * | 11/1942 | Edwards | G01F 23/0023 33/720 |
| 3,441,737 | A | * | 4/1969 | Topol | G01N 21/8507 250/564 |
| 3,445,291 | A | * | 5/1969 | Stein | H01M 6/5044 429/90 |
| 4,523,465 | A | * | 6/1985 | Fasching | G01F 23/0023 367/81 |
| 4,719,359 | A | * | 1/1988 | Rose | G01F 23/292 250/573 |

(Continued)

OTHER PUBLICATIONS

Haptics—Solutions for ERM and LRA Actuators, Texas Instruments, 2013, available at https://www.ti.com/lit/ml/sszb151/sszb151.pdf?ts=1634223375990&ref_url=https%253A%252F%252Fwww.google.com%252F (Year: 2013).*

*Primary Examiner* — Daniel R Miller
*Assistant Examiner* — Eric Sebastian Von Wald
(74) *Attorney, Agent, or Firm* — Guy V. Manning (57) ABSTRACT

A plumb bob for detecting differing fluids in tanks and vessels includes a tubular housing having enclosed ends. An LED infrared transmitter disposed in the tubular housing transmits infrared signals through fluids in which the plum bob is immersed to a LED infrared receiver. Circuitry disposed within the housing provides power to the LEDs and operates an LED driver to determine fluid parameters for the types of fluids in which the plumb bob is immersed. One or more vibration signal generators emits different vibrations according to the types of fluids detected. The vibration signal generators transmit the vibrations from the housing through a gauge tape line to a gauge tape reel held by an operator, who can determine the fluid types by the vibrations.

14 Claims, 7 Drawing Sheets

(56) References Cited

U.S. PATENT DOCUMENTS

| | | | |
|---|---|---|---|
| 4,747,451 A * | 5/1988 | Adams, Jr | E21B 47/047 340/854.4 |
| 4,841,157 A * | 6/1989 | Downing, Jr. | G01N 21/53 250/574 |
| 5,035,581 A | 7/1991 | McGuire et al. | |
| 5,105,085 A | 4/1992 | McGuire et al. | |
| 5,237,857 A * | 8/1993 | Dobson | G01F 23/245 73/61.44 |
| 6,076,049 A | 6/2000 | Lievois et al. | |
| 7,938,002 B1 * | 5/2011 | Lazos | G01F 23/0023 73/290 B |
| 2005/0210963 A1 * | 9/2005 | Yekutiely | G01F 23/40 73/53.01 |
| 2007/0240505 A1 * | 10/2007 | Cammarata | G01F 23/24 73/304 R |
| 2010/0241369 A1 * | 9/2010 | Wicht | G01F 23/0061 702/55 |
| 2013/0238145 A1 * | 9/2013 | Hammer | G01F 23/0076 700/279 |

* cited by examiner

ELECTRONIC VIBRATING PLUMB BOB FOR THE DETECTION OF DIFFERING FLUIDS IN TANKS AND VESSELS

TECHNICAL FIELD OF THE INVENTION

The present invention relates in general to gauging lines and plumb bobs for manually measuring fluid levels in petroleum storage tanks and vessels, and in particular to plumb bobs for measuring the types of fluids at different depths in petroleum storage tanks and vessels.

CROSS-REFERENCE TO RELATED APPLICATION

The present application is a non-provisional of and claims domestic benefit from U.S. Provisional Patent Application Ser. No. 62/882,356, filed Aug. 2, 2019, entitled "An Electronic Vibrating Plumb Bob "BuzzBob" for the Detection of Differing Fluids in Tanks or Vessels."

BACKGROUND OF THE INVENTION

Tank gauging is the process of measuring the level of a fluid such as petroleum in a tank. A reel containing a steel tape measure with an attached plumb bob is lowered into the tank to measure the overall height of the fluid. However, in a tank with a petroleum product there may be and in fact usually is water which has settled out in the bottom of the tank. Furthermore, the petroleum product contained in the tank may also have entrained water which has failed to completely settle out. In order for a tank full of petroleum to be "sale-able" it is customary to have less than 6" of water in the tank bottom and the petroleum product itself must contain 1% or less entrained water.

SUMMARY OF THE INVENTION

This present disclosure is directed toward an enhanced replacement electronic plumb bob for a tank gauge line that will allow the user to detect and measure the amount of water in the bottom of the tank and whether or not any entrained water in the oil is below the acceptable amount. Using an industry standard tank gauge line the user will simply unhook the "passive" plumb bob of the clipped end of the gauge tape and hook on in its place an "active" vibrating plumb bob, preferably a "BuzzBob™" brand vibrating plumb bob made according to the present invention. As the user lowers the gauge line through the fluid in the tank the vibrating plumb bob will alert the operator with a "buzz" by vibrating the gauge line as it encounters water in the bottom of the tank and any entrained water left in the oil above the (sale-able) limit. This will allow the operator a greater and more complete analysis (gauge) of all the fluids contained in the tank. The level and quantity of each fluid in the tank can be measured and determined accurately.

The vibrating plumb bob of the present disclosure has an Infrared LED light emitter and an Infrared LED light receiver which are aligned in registration and operated to detect the presence of and measure the mixture of fluids either organic or inorganic. An operator using the vibrating plumb bob is notified via vibration when the presence of water, oil and an emulsion are detected. The vibration or haptic feedback mechanism is electronically controlled and varies in frequencies or pulses to also notify the operator of fluid content in contact with the nose, system status, fluid content, calibration, condition of battery, and power on-off status etc. The vibrating plumb has electronic circuitry with one or more data processing circuits to power and fully control operation of the vibrating plumb bob. Both an inclinometer and a gyroscope are included for feedback of plumb bob body position or orientation. The inclinometer is preferably a mechanical or liquid switch for detecting the orientation of the plumb bob, which once activated will power on the vibrating plumb bob and the gyroscope will then detect relative positioning of the plumb bob for powering the fluid detection circuits which include the infrared LED emitter and infrared LED receiver for measuring the content of the fluids adjacent the nose of the vibrating plumb bob.

The vibrating plumb bob of the present disclosure has an external housing to provide a sealed, self contained, rechargeable, vibrating plumb bob. The housing is a tubular body with sealed ends which is formed of varying materials such as metal, plastic, composite or a combination thereof. The interior space within the tubular body is filled with a potting material such as a clear epoxy to assure the housing is both fluid sealed and hermetically sealed. The external housing provides two electric contacts to provide an electric contact circuit connected with internal components and to provide electric power for recharging the battery. Both the electric contact circuit for connecting to an external battery charger, and the infrared LED emitter and infrared LED receiver are configured to provide a program interface.

DESCRIPTION OF THE DRAWINGS

For a more complete understanding of the present invention and the advantages thereof, reference is now made to the following description taken in conjunction with the accompanying Drawings in which FIGS. 1 through 17 show various aspects for electronic vibrating plumb bob for the detection of differing fluids in tanks and vessels signalling made according to the present disclosure, as set forth below:

DETAILED DESCRIPTION OF THE INVENTION

Figure 1:
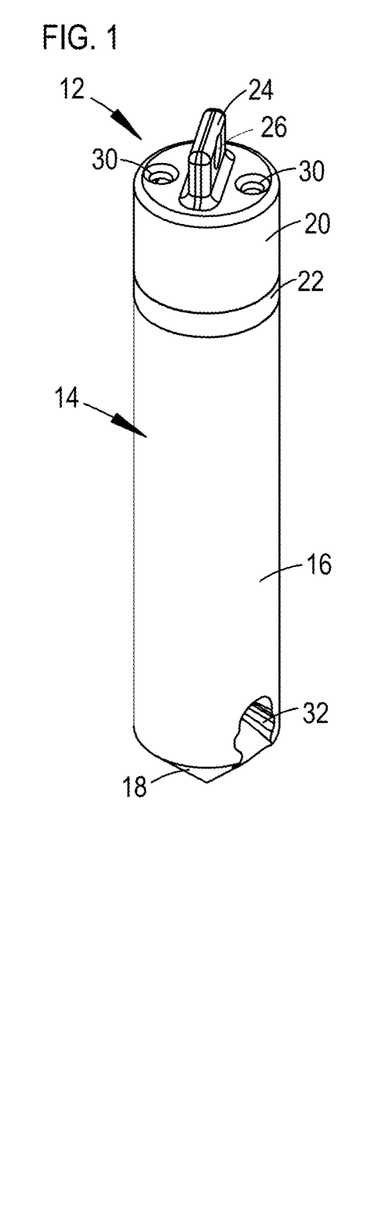
FIG. 1 is a perspective view of an electronic vibrating plumb bob made according to the present disclosure.
Figure 2:
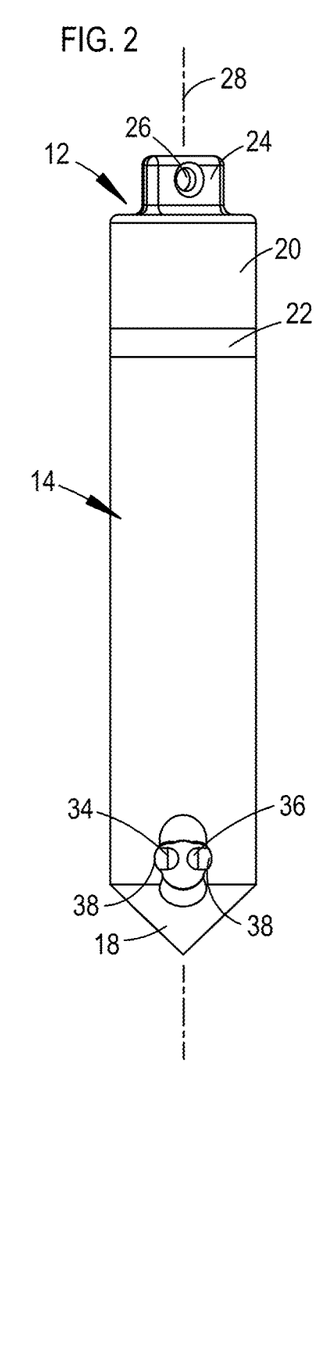
FIG. 2 is a front, elevation view of the plumb bob.

Referring to the Figures, FIG. 1 is a perspective view and FIG. 2 is a side elevation view of an electronic vibrating plumb bob 12. The plumb bob 12 has a housing 14 which defines a tubular body. The housing 14 includes a lower housing 16 having a nose 18, an upper housing 20 providing a cap, and an intermediate housing 22, each of which are preferably concentrically disposed about a longitudinal axis 28 of the plumb bob housing 14. The upper housing 20 has a tab 24 which protrudes from the upper end of the upper housing 22 and has a mounting aperture 24 for connecting to a tank gauging tape in place of conventional plumb bobs. Two fill ports 30 are provided on the top side of the upper housing 20 for filling the housing 14 with a potting material, such as an encapsulating epoxy to prevent moisture from entering the housing 14 and to enhance vibrational output from the housing 14. The housing 14 is filled with the potting material after the plumb bob 12 is fully assembled. The lower housing 16 has an aperture 32 which extends transverse to the longitudinal axis 28. An LED transmitter 34 and an LED receiver 38 are shown protruding from within the housing 14 and through the LED ports into the transversely extending aperture 32. The LEDS 34 and 36 extend through LED ports 38 in directions which are transverse to a longitudinal axis of the aperture 32, and transverse to the longitudinal axis 28 of the housing 14. The LEDS 34 and 36 are aligned in registration for passing an optical signal there-between which is processed to determine and differentiate between the presence of water, oil and gas, and to determine the water content in oil. Preferably, the lower housing 16 and the upper housing 20 are formed of conductive materials, such as stainless steel, with the upper housing 20 being magnetic. The intermediate housing 22 is formed of non-conductive materials, such as plastics, such as Nylon and Delrin.

Figure 3:
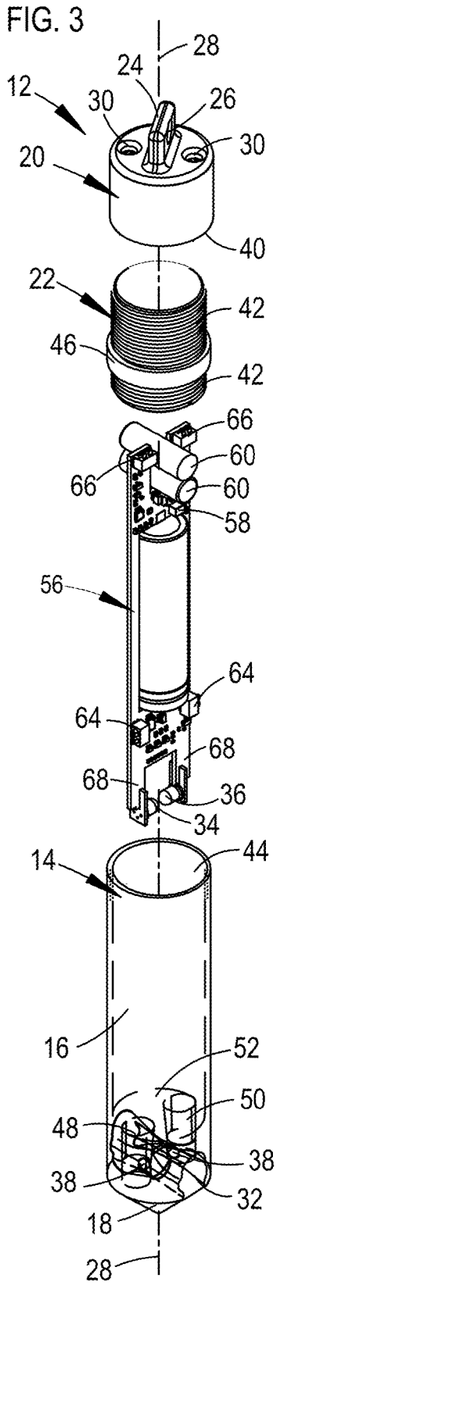
FIG. 3 is an exploded perspective view of the plumb bob.

FIG. 3 is an exploded perspective view of the plumb bob 12. A lower end of the upper housing 20 has interior threads 40, and an upper end of the lower housing 16 has interior threads 44. The intermediate housing 22 provides a threaded nipple having exteriorly threaded ends 42 for threadingly securing together the upper housing 20 and the lower housing 16. In other embodiments, smooth sockets and nipples may instead be provided without the use of threads 40, 42, and 44 and the entire assembly may be held together with a potting material, such as the epoxy. The intermediate housing 22 has an annular-shaped shoulder 46 which extends between the two threaded ends 42. The annular-shaped shoulder provides a stop for engaging on one side with the upper end of the lower housing 14 and for engaging on an opposite side with the upper terminal end of the upper housing 20.

The lower housing 16 has a solid bottom nose section 52 into which two blind holes 48 and 50 are formed. The two blind holes 48 and 50 have longitudinal axes which extend substantially parallel to the longitudinal axis 28, on opposite diametrical sides of the housing 14. The offset direction between the two blind holes 48 and 50 is preferably transverse to the longitudinal axis of the aperture 32, which is positioned to intersect the two blind holes 48 and 50 and provide the two LED ports 38.

A circuit board 56 fits within the hollow, tubular shaped body of the housing 14. The circuit board 56 contains circuitry for operating the plumb bob 12 and haptic signalling devices 60. The haptic signalling device 60 is preferably provided by a vibrator, or vibration signal generators, such as, for example, an Eccentrc Rotating Mass ("ERM") or a Linear Resonant Actuator ("LRA"). The circuit board 56 also has a rechargeable internal battery, sidewall contacts 64 and top contacts 66. The sidewall contacts 64 have spring biased contacts which electrically press against the interior side of the housing 14. The top contacts 66 are spring biased and electrically press against the undersized of the top of the upper housing 20. The lower end of the circuit board 56 has two legs 68 which extend downward from the lower end of the circuit board 56, providing a mount for the LED transmitters and receivers 34 and 36.

Figures 4, 5, 6, 7:
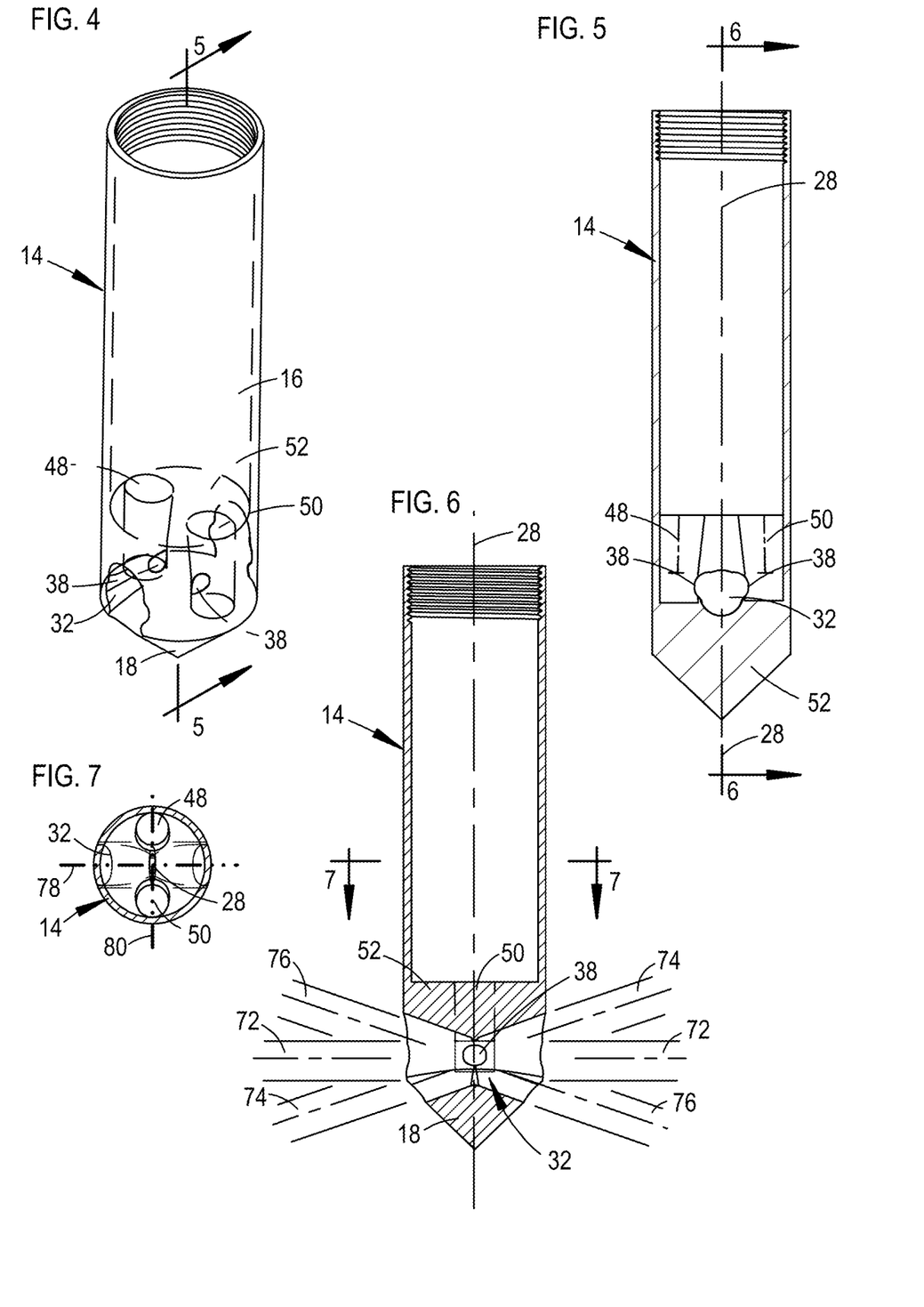
FIG. 4 is perspective view of the lower housing of the plumb bob.
FIG. 5 is a sectional view of the plumb bob, taken along section line 5-5 of FIG. 4.
FIG. 6 is a sectional view of the plumb bob, taken along section line 6-6 of FIG. 5.
FIG. 7 is a cross-sectional view of the plumb bob, taken along section line 7-7 of FIG. 6.

FIG. 4 is perspective view of the lower housing 14 of the plumb bob 12; FIG. 5 is a sectional view of the lower housing 14 taken along section line 5-5 of FIG. 4; FIG. 6 is a sectional view of the lower housing 14 taken along section line 6-6 of FIG. 5; and FIG. 7 is a cross-sectional view of the lower housing 14 taken along section line 7-7 of FIG. 6. As noted above in reference to FIG. 3, two blind holes 48 and 50 are formed into the solid bottom nose section 52 with longitudinal axes which extend substantially parallel to the longitudinal axis 28, on opposite diametrical sides of the housing 14. The offset direction between the two blind holes 48 and 50 is preferably transverse to the longitudinal axis of the aperture 32. The transverse aperture 32 extends transverse to the longitudinal axis 28 and is configured such that it intersects outer peripheral edges of the two blind holes 48 and 50 to provide the two LED ports 38 which provides two respective windows for the LED Tx 34 (transmitter) and the LED Rx 36 (receiver) to extend outward from within the lower housing 16. The LED Tx 34 (transmitter) and the LED Rx 36 (receiver) will extend through the ports 38 in both registration and opposed alignment for the LED Tx 34 (transmitter) to transmit optical signals through a portion of the aperture 32 and to the LED Rx 36 (receiver), through a fluid which is disposed in the aperture 32 and located between the two LEDS 34 and 35.

The transverse aperture 32 is shown extending through the solid bottom nose 52 of the nose section of the lower housing 16, substantially perpendicular to the longitudinal axis 28. The aperture 32 is preferably formed by drilling three holes 72, 74 and 76 which are shown a lines projection lines extending through the bottom nose 52, each having a respective central longitudinal axis which is located in a singular hole alignment plane 78 (shown in FIG. 7) which extends through the longitudinal axis 28 of the lower housing 16, and midway between the two central longitudinal axes of respective ones of the blind holes 48 and 50. The two central longitudinal axes of respective ones of the blind holes 48 and 50 together define a blind hole plane 80 which contains the longitudinal axes of the blind holes 48 and 50 and which is preferably at a right angle to the hole alignment plane 78. Each of the holes 72, 74 and 76 passes thorough respective peripheries of the blind holes 48 and 50 to provide the LED ports 38 which extend between the transverse aperture 32 and the interiors of respective ones of the blind holes 48 and 50, with the LED ports 38 configured for passing the LED Tx34 and the LED Rx 36 into opposed positions in registration for passing optical signals therebetween. The central longitudinal axes of the three holes 72, 74 and 76 are aligned at acute angles.

Figure 8:
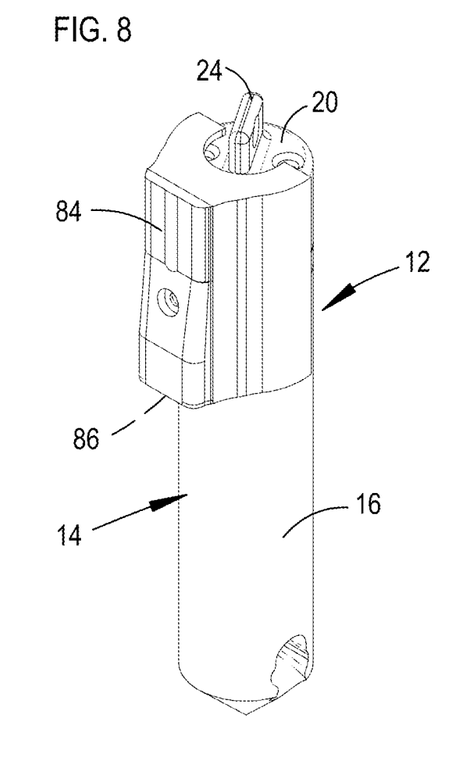
FIG. 8 is perspective view of the plumb bob showing an external battery charger for providing electric power to charge an internal battery of the plumb bob.

FIG. 8 is perspective view of the plumb bob 12 showing an external battery charger 84 mounted to the plumb bob 12 for providing electric power to charge an internal battery located within the housing 14. The battery charger 84 has a power connector port 86 for receiving a standard port from a power supply, preferably a five volt USB-C connector such that a user's cell phone charging power supply may conveniently be used to charge the vibrating plumb bob 12. The external battery charger fits on top of the housing 14, fitting around the tab 24 and extending from the upper housing 20 to the lower housing 16. The battery charger 84 provides a two contact electrical circuit to the plumb bob 12 and, in addition to charging the internal battery of the plumb bob 12, may also be used for communicating with the internal circuitry of the plumb bob 12 such as by use of a digitally encoded signal.

Figure 9:
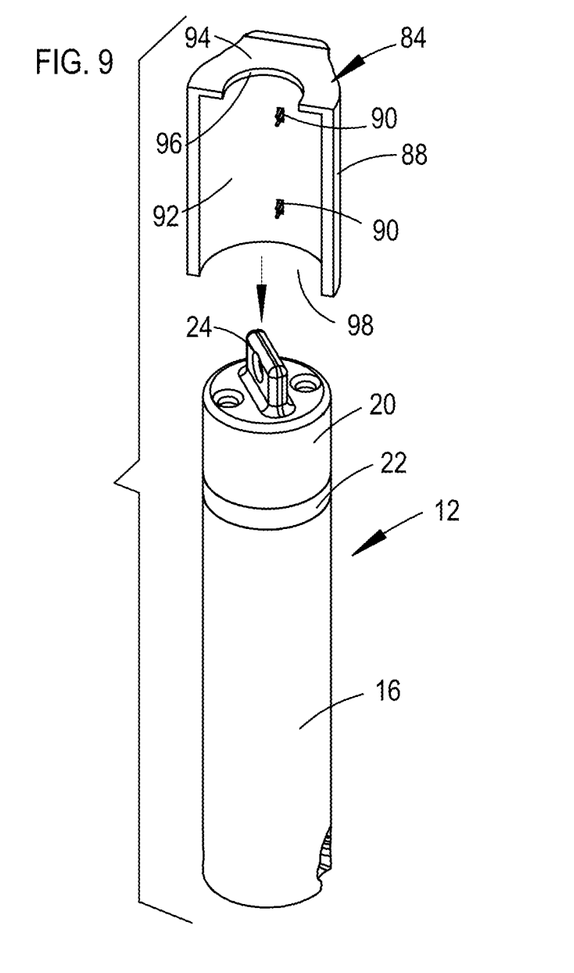
FIG. 9 is a perspective view showing the external battery charger being mounted to the plumb bob.

FIG. 9 is a perspective view showing the external battery charger 84 being mounted to the plumb bob 12. The external battery charger 88 has a battery charger housing 88 which has two electric contacts 90 which are configured in a spaced apart alignment for separately connecting the upper housing 20 and the lower housing 16. The intermediate housing 22 is preferably formed of non-conductive materials and is located between the lower housing 16 and the upper housing 20 to provide electrical insulation there-between. The battery charger housing 88 has an alignment surface 92 which is contoured for fitting against the side of the plumb bob housing 14 in close alignment. An upper surface of the battery charger housing 88 provides a stop 94 for engaging the upper side of the upper housing 20 and has an opening for passing the tab 24 which extends upward from the upper surface of the upper housing 20. The battery charger housing 88 also has an open lower end 98 for fitting around the exterior of the lower housing 16.

Figure 10:
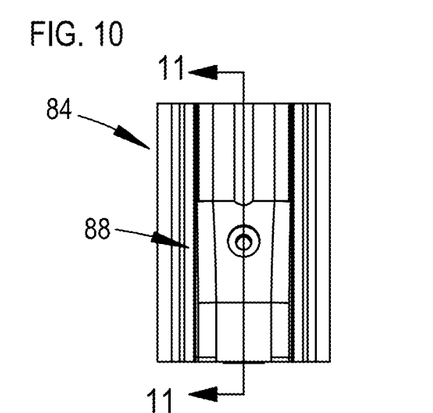
FIG. 10 is a side view of the external battery charger and FIG. 11 is a longitudinal sectional view of the external battery charger taken along section line 11-11.
Figure 11:
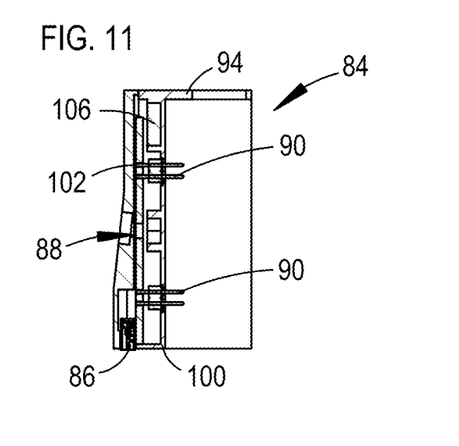

FIG. 10 is a side view of the external battery charger 84 and FIG. 11 is a longitudinal sectional view of the external battery charger 84 taken along section line 11-11 of FIG. 10. FIG. 11 shows the battery charger housing 88 having a main body 100 and a cover 102. The two electric contacts 90 are shown extending outward from the main body 100 configured in a spaced apart alignment for separately connecting the upper housing 20 and the lower housing 16. The two electric contacts 90 are each preferably provided two spring type contact pins, such as pogo pins. A magnet 106 is secured in the battery charger housing 88 for magnetically attaching the external battery charger to the upper housing 20. The upper housing 20 is preferably formed of stainless steel with sufficient magnetic properties for the magnet 106 to secure the battery charger 84 to the upper housing 20.

Figure 12:
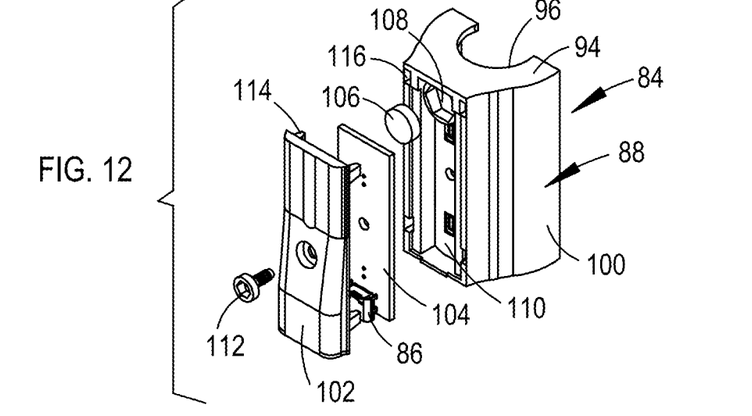
FIGS. 12 and 13 are exploded perspective views of the external battery charger for the plumb bob, viewed from opposite directions.
Figure 13:
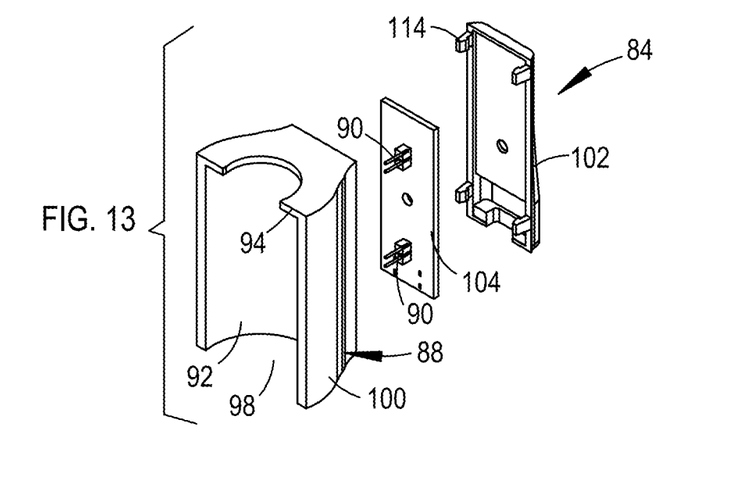

FIGS. 12 and 13 are exploded perspective views of the external battery charger 84, viewed from opposite directions. The power connector port 86 and the electric contacts 90 are mounted to a circuit board 104 configured in an operative arrangement. The magnet 106 is preferably a permanent magnet which fits within a socket 108 located in a recess 110 on one side of the main body 100. The circuit board 104 will be placed on top of the recess 110 in the main body 100, and the cover 102 will be placed over the circuit board 104. Enclosure tabs 114 are provided for by snap-type tabs which fit within corresponding sockets 116 formed into the main body for securing the enclosure tabs 114 and the cover 102 to the main body 100. The cover 102 is also secured to the main body 100 by a threaded fastener 112.

Figure 14:
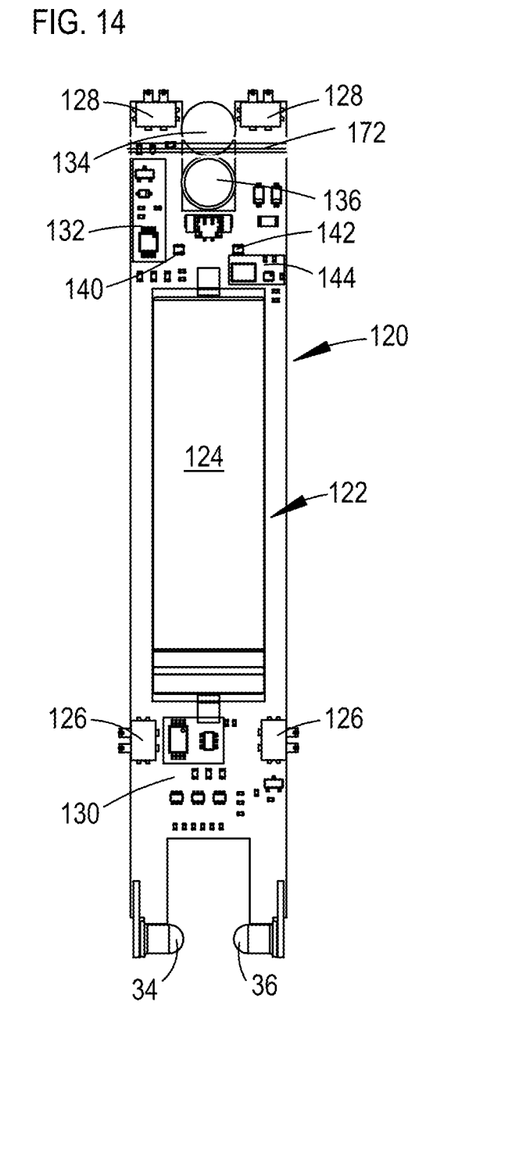
FIGS. 14 and 15 are side elevation views of opposite sides of a primary circuit board of the plumb bob.
Figure 15:
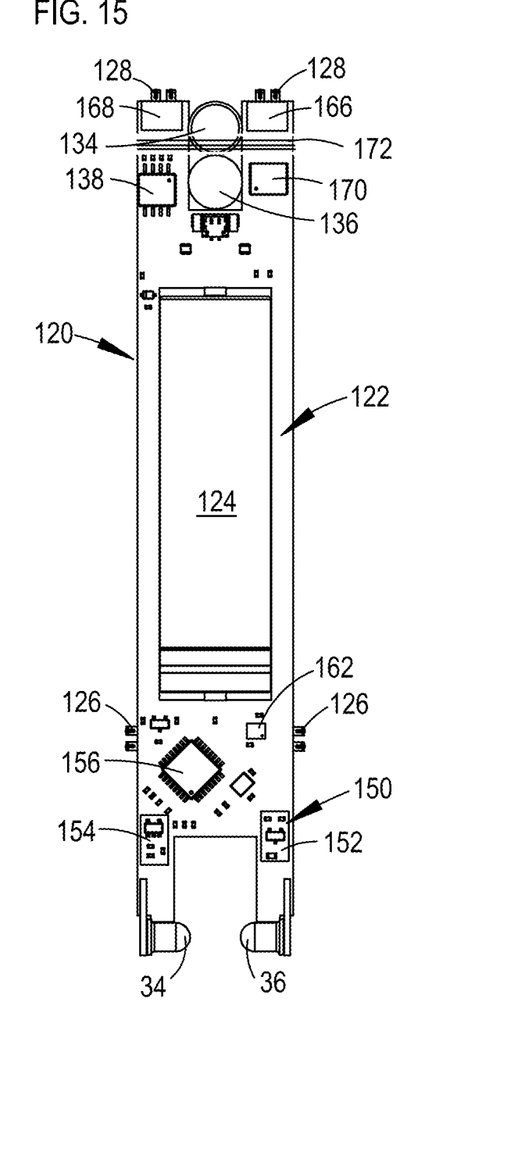

FIGS. 14 and 15 are side elevation views of opposite sides of a primary circuit board 122 providing circuitry 120 for the vibrating plumb bob 12. A rechargeable power battery 124 is mounted in a central portion of the circuit board 122. Spring contacts 126 are mounted to opposite edges of a lower portion of the circuit board 122 for making electrical contact with the lower housing 16. Spring contacts 128 are mounted to an upper edge of the circuit board 122 for making electrical contact with the upper housing 120. A battery management system and power supply unit 130 is provided by components mounted adjacent to the spring contacts 126. A battery charger circuit 132 and a DC-DC power converter circuit 144 are mounted to the circuit board 122 adjacent to the upper end of the battery 24. Vibrators 134 and 136 are mounted with longitudinal axes extending transverse to the planes of mounting surfaces of the planar circuit board 122. The vibrators 134 and 136 are vibration signal generators and are preferably provided by one of, or a combination of, eccentric rotating mass vibration motors (ERMs) or linear resonant actuators (LRAs). Indicator LEDs 140 and 142 are mounted to the circuit board 122 such that they are preferably adjacent to the annular-shaped ring 46 of the intermediate housing 22, which preferably has an opacity for transmitting light emitted from the LEDs 140 and 142. In some embodiments other LEDs may be mounted in this region of the circuit board 122 for receiving light signals from light sources external to the plumb bob housing 14 to provide data communication between the circuit board 122 and devices external to the housing 14. In the current configuration the LEDs 140 and 142 provide signal indicators for an operator regarding the status and detection states of the plumb bob 12.

Measurement and detection circuits 150 are provided for detecting the natures of the fluids in which the plumb bob 12 is immersed. The circuits 150 include the LED Tx 34, the LED Rx 36, an LED driver 152, and a signal conditioner 154. The micro-controller 156 preferably controls operation of the circuit board 122, including the LED driver 152, the signal conditioner 154, and operation of the output signal circuits and input signal circuits noted herein. Probe angular position sensors 162 are mounted to the circuit board 122 in proximity to the micro-controller 156. The probe angular position sensors 162 are preferably provided by both a mechanical tilt sensor and a gyroscope with attendant circuitry. The mechanical tilt sensor is used for turning the power on and off for the vibratory plumb 12 so that power is not required for sensing the angular position of the probe 12 when in a powered-off state to prevent depletion of the battery 124 by power consumption from the gyroscope and micro-controller 156. The gyroscope is used for detecting the angular position when the plumb bob 12 is in a powered-on state.

A program interface 166 is mounted to the upper end of the circuit board 122 and has contacts for a user connect to the micro-controller. The program interface is also operable for receiving analog or digital signals from the battery charger 84. A digital signal output 168 is also provided at the end of the circuit board 122.

A communication and modulation module 170 is used to provide a second method of modulating a message signal (data) over a carrier signal through modulation techniques, such as amplitude or frequency modulation. The modulated carrier signal is amplified and transmitted over a connected gauge line through electromagnetic waves utilizing the magnetizing coils 172. The magnetic coils 172 are wound in the circular manner with a calculated number of turns, thickness of copper wire and diameter of the coil and perpendicular to the connected gauge line. Alternatively vibration motors in the vibrators 134 and 136 are used to transmit information to a display unit over physical vibrations. When this method is used, the vibrators 134 and 136 are preferably driven with data pulse width modulation, and the emitted physical vibrations travel through the connected gauge line and are observed at display unit with a connector accelerometer for de-modulating the data signal and determining real time information of the depth, IR info, battery status, and other parameters.

Figure 16:
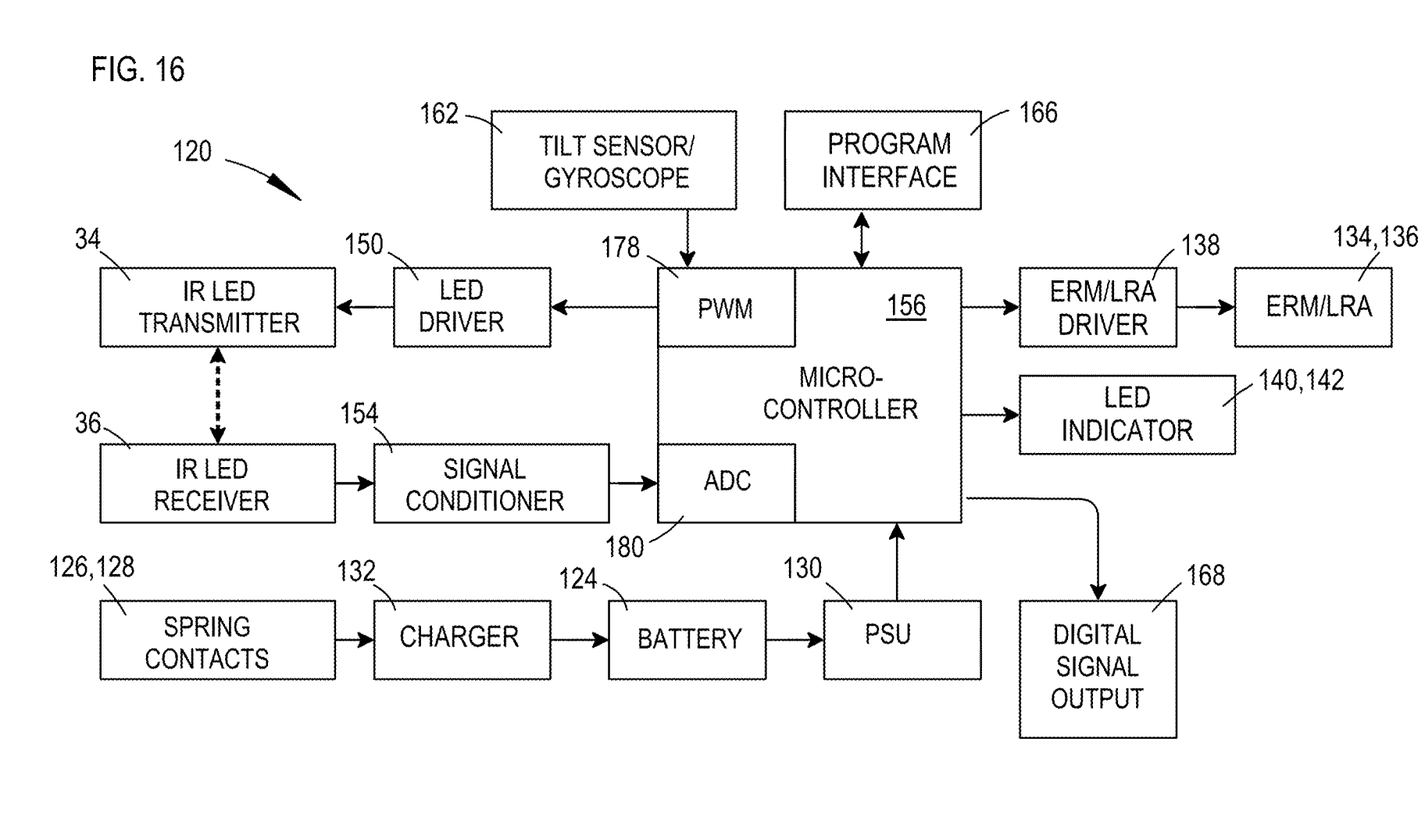
FIG. 16 is a block diagram showing the primary electronic circuitry of the plumb bob.

FIG. 16 is a block diagram showing the primary electronic circuitry 120 of the plumb bob 12. Most of the shown components for the circuitry 120 are described above reference to FIGS. 14 and 15. The micro-controller 156 is shown having a pulse width modulator PWM 178 and an analog to digital converter ADC 180. The PWM 178 will provide control signals to the LED driver 150 for controlling operation of the IR LED transmitter 34. The ADC 180 receives and converts signals emitted from the signal conditioner 154, which are received from the IR LED receiver 36. The digital signals from the ADC 180 are processed by the micro-controller according to the installed software instructions to determine the parameters of the fluid in which the plumb bob is immersed.

Figure 17:
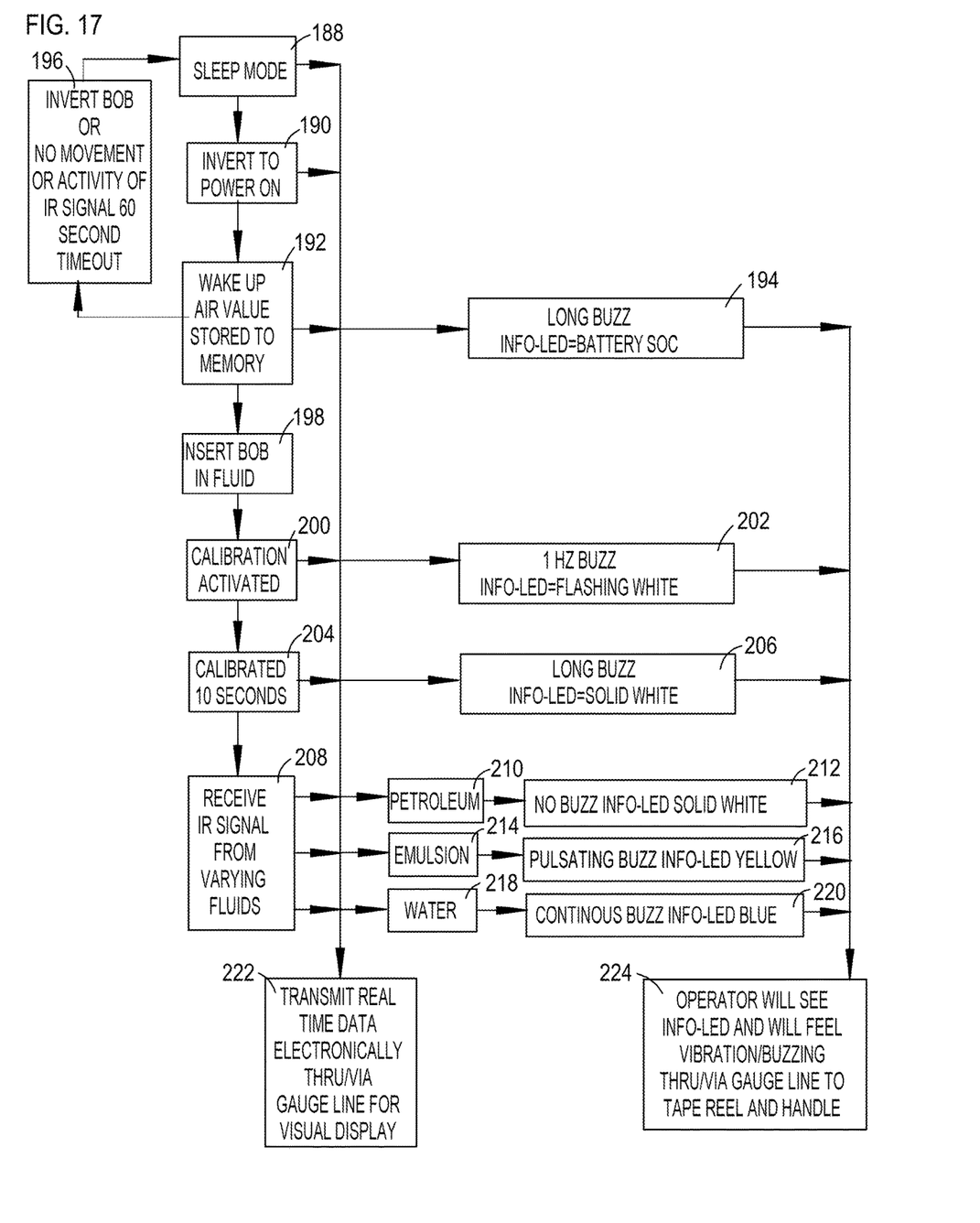
FIG. 17 is a flow chart depicting operation of the plumb bob.

FIG. 17 is a flow chart depicting operation of the plumb bob 12. In operation, to power plumb bob 12 it is moved to an inverted position in which the nose 18 of the plumb bob 12 is raised until it is disposed vertically above the center of the plumb bob 12 to switch the mechanical switch and then the gyroscope of the angular position sensors 162, and then lowered to a downward position disposed beneath the center of the plumb bob 12. The procedure is repeated to power off the plumb bob 12. The process depicted starts with the plum bob 12 in sleep mode in step 188. The process then proceeds to step 190 and the plumb bob 12 is inverted to power on. The process then proceeds to step 192 and the plumb bob 12 detects whether the IR LED's 34 and 36 are detecting the value for air stored in memory. If so, a long buzz is emitted in step 194 and a light signal is emitted from the indicator LEDs 140 and 142 which are configured to indicate the state of charge of the power battery 56/124. If in step 196 the plumb bob 12 is inverted again or non movement, activity or change in the IR signal circuit is detected for a predetermined time period, such as 60 seconds, the plumb bob 12 will return to step 188, power down and enter sleep mode.

In step 198 the process proceeds from step 192 to step 198 and the plumb bob 12 is inserted into fluid. The process then proceeds to step 200 and calibration mode is activated. In response to entering calibration mode in step 202 a one hertz buzz is emitted and the info LEDs 140 and 142 flash white optical signal. The process then proceeds to step 204 and the plumb bob 12 is calibrated for 10 seconds. The process in step 206 will emit a long buzz and the info LEDs 140 and 142 display a solid white optical signal. The process then proceeds to step 208 and plumb bob 12 will pass through fluids and receive various IR signals from the fluids passed through. If petroleum is detected in step 210 no buzz will be emitted and the info LEDs 140 and 142 will display a solid white optical signal. If emulsion is detected in step 214 then in step 216 a pulsating buzz will be emitted and the info LEDs 140 and 142 will emit a yellow optical signal. If water is detected in step 218 then in step 220 a continuous buzz will be emitted and the info LEDs 140 and 142 will display a blue optical signal. The process will proceed to step 222 and the real time data will be transmitted through the gauge line for visual display. In step 224 the operator will see an information display LED indicating the various types of vibrations passed through the gauge line to the tape reel and the tape reel handle. The process will continue until the process returns to step 196 and then the plumb bob 12 returns to sleep mode in step 188.

The present invention provides advantages of a plumb bob for gauging tank and vessel fluids to determine various parameters for the fluids contained therein. The plumb bob of the present invention provides vibratory haptic signals which an operator can feel through the gauge tape line. A surface display may also be provided by signals transmitted up hole by vibration of the gauge tape or by electrical signals through the gauge tape. The plumb bob of the present invention is self contained, permanently sealed from fluids by a potting material yet operable for detecting fluids and transmitting data through a gauging tape. A power storage battery located inside the plumb bob may be charged by connection of an external battery charger which connects to the battery through the plumb bob housing.

Although the preferred embodiment has been described in detail, it should be understood that various changes, substitutions and alterations can be made therein without departing from the spirit and scope of the invention as defined by the appended claims.

What is claimed is:

1. A plumb bob for gauging storage levels of differing fluids in tanks and vessels, comprising:
   a tubular housing having enclosed ends;
   an LED infrared transmitter and an LED infrared receiver disposed in said tubular housing for transmitting infrared signals through fluids in which said plum bob is disposed, from said LED infrared transmitter to said LED infrared receiver;
   circuitry disposed within said housing providing power to said LED infrared transmitter and said LED infrared receiver, operating a driver for said LED infrared transmitter and receiving signals from said LED infrared receiver, and therefrom determining fluid parameters for detecting the type of fluid in which the plumb bob is disposed;
   one or more vibration signal generators, wherein said circuitry is operable to power and control operation of said one or more vibration signal generators to vary vibrations emitted there-from according to the types of fluids detected in which said plumb bob is disposed; and
   wherein said vibration signal generators are operably connected to said tubular housing for transmitting said vibrations from said vibration signal generators to said housing and through a gauge tape line to a gauge tape reel for detection by an operator holding the gauge tape reel;
   a power storage battery disposed within said tubular housing;
   said tubular housing having an upper section, an intermediate section, and a lower section, wherein said upper and said lower sections are formed of electrically conductive materials and said intermediate section is formed of non-conductive material to electrically insulate said upper section from said lower section; and
   an external battery charger having two spaced apart contacts which connect respective ones of said upper section and said lower section to provide electric power for charging said power storage battery.

2. The plumb bob according to claim 1, further comprising said tubular housing being filled with a potting material to seal fluids from being entrained therein.

3. The plumb bob according to claim 2, further comprising said potting material being a clear epoxy.

4. The plumb bob according to claim 1, further comprising signaling circuitry disposed within said tubular housing and connected to said upper section and said lower section for receiving data signals which provide instructions to said circuitry for setting programming steps for operation of said plumb bob.

5. The plumb bob according to claim 1, further comprising signaling circuitry disposed within said tubular housing and connected to said upper section and said lower section for transmitting data signals through said upper section and said lower section for externally determining operating states for said plumb bob.

6. A plumb bob for gauging storage levels of differing fluids in tanks and vessels, comprising:
- a tubular housing having enclosed ends;
- an LED infrared transmitter and an LED infrared receiver disposed in said tubular housing for transmitting infrared signals through fluids in which said plum bob is disposed, from said LED infrared transmitter to said LED infrared receiver;
- circuitry disposed within said housing providing power to said LED infrared transmitter and said LED infrared receiver, operating a driver for said LED infrared transmitter and receiving signals from said LED infrared receiver, and therefrom determining fluid parameters for detecting the type of fluid in which the plumb bob is disposed;
- one or more vibration signal generators, wherein said circuitry is operable to power and control operation of said one or more vibration signal generators to vary vibrations emitted there-from according to the types of fluids detected in which said plumb bob is disposed;
- wherein said vibration signal generators are operably connected to said tubular housing for transmitting said vibrations from said vibration signal generators to said housing and external of said tubular housing for transmitting to an operator measuring the storage levels;
- a power storage battery disposed within said tubular housing;
- said tubular housing having an upper section, an intermediate section, and a lower section, wherein said upper and said lower sections are formed of electrically conductive materials and said intermediate section is formed of non-conductive material to electrically insulate said upper section from said lower section; and
- wherein respective ones of said upper section and said lower section provide electric power for charging said power storage battery.

7. The plumb bob according to claim 6, wherein signaling circuitry is disposed within said tubular housing and connected to said upper section and said lower section for receiving data signals which provide instructions to said circuitry for setting programming steps for operation of said plumb bob.

8. The plumb bob according to claim 6, wherein signaling circuitry is disposed within said tubular housing and connected to said upper section and said lower section for transmitting data signals through said upper section and said lower section for externally determining operating states for said plumb bob.

9. The plumb bob according to claim 6, wherein signaling circuitry is disposed within said tubular housing and connected to said upper section and said lower section for receiving data signals which provide instructions to said circuitry for setting programming steps for operation of said plumb bob, and for transmitting data signals through said upper section and said lower section for externally determining operating states for said plumb bob.

10. The plum bob according to claim 9, further comprising said tubular housing being filled with a potting material to seal fluids from being entrained therein.

11. The plumb bob according to claim 10, further comprising said potting material being a clear epoxy.

12. The plumb bob according to claim 6, wherein said tubular housing is connected to a gauge tape line which is wound on a gauge tape reel for suspending said tubular housing within the fluids.

13. A plumb bob for gauging storage levels of differing fluids in tanks and vessels, comprising:
- a tubular housing having an upper section, an intermediate section, a lower section and enclosed ends;
- an LED infrared transmitter and an LED infrared receiver disposed in said tubular housing for transmitting infrared signals through fluids in which said plum bob is disposed, from said LED infrared transmitter to said LED infrared receiver;
- circuitry disposed within said housing providing power to said LED infrared transmitter and said LED infrared receiver, operating a driver for said LED infrared transmitter and receiving signals from said LED infrared receiver, and therefrom determining fluid parameters for detecting the type of fluid in which the plumb bob is disposed;
- one or more vibration signal generators, wherein said circuitry is operable to power and control operation of said one or more vibration signal generators to vary vibrations emitted there-from according to the types of fluids detected in which said plumb bob is disposed; and
- wherein said vibration signal generators are operably connected to said tubular housing for transmitting said vibrations from said vibration signal generators to said housing and through a gauge tape line to a gauge tape reel for detection by an operator holding the gauge tape reel;
- wherein said upper section and said lower section are formed of electrically conductive materials and said intermediate section is formed of non-conductive material to electrically insulate said upper section from said lower section, and
- wherein signaling circuitry is disposed within said tubular housing and connected to said upper section and said lower section for receiving data signals which provide instructions to said circuitry for setting programming steps for operation of said plumb bob.

14. A plumb bob for gauging storage levels of differing fluids in tanks and vessels, comprising:
- a tubular housing having an upper section, an intermediate section, a lower section and enclosed ends;
- an LED infrared transmitter and an LED infrared receiver disposed in said tubular housing for transmitting infrared signals through fluids in which said plum bob is disposed, from said LED infrared transmitter to said LED infrared receiver;
- circuitry disposed within said housing providing power to said LED infrared transmitter and said LED infrared receiver, operating a driver for said LED infrared transmitter and receiving signals from said LED infrared receiver, and therefrom determining fluid parameters for detecting the type of fluid in which the plumb bob is disposed;
- one or more vibration signal generators, wherein said circuitry is operable to power and control operation of said one or more vibration signal generators to vary vibrations emitted there-from according to the types of fluids detected in which said plumb bob is disposed; and
- wherein said vibration signal generators are operably connected to said tubular housing for transmitting said vibrations from said vibration signal generators to said housing and through a gauge tape line to a gauge tape reel for detection by an operator holding the gauge tape reel;

wherein said upper section and said lower section are formed of electrically conductive materials and said intermediate section is formed of non-conductive material to electrically insulate said upper section from said lower section, and wherein signaling circuitry is disposed within said tubular housing and connected to said upper section and said lower section for transmitting data signals through said upper section and said lower section for externally determining operating states for said plumb bob.

* * * * *